Figure 1:
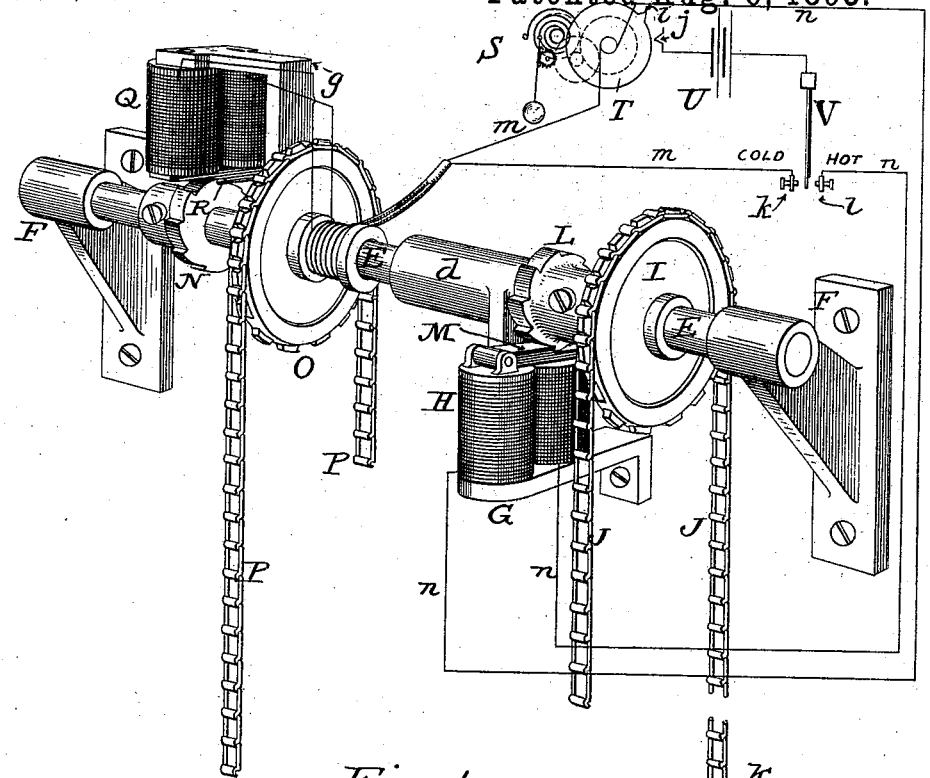
Figure 1:
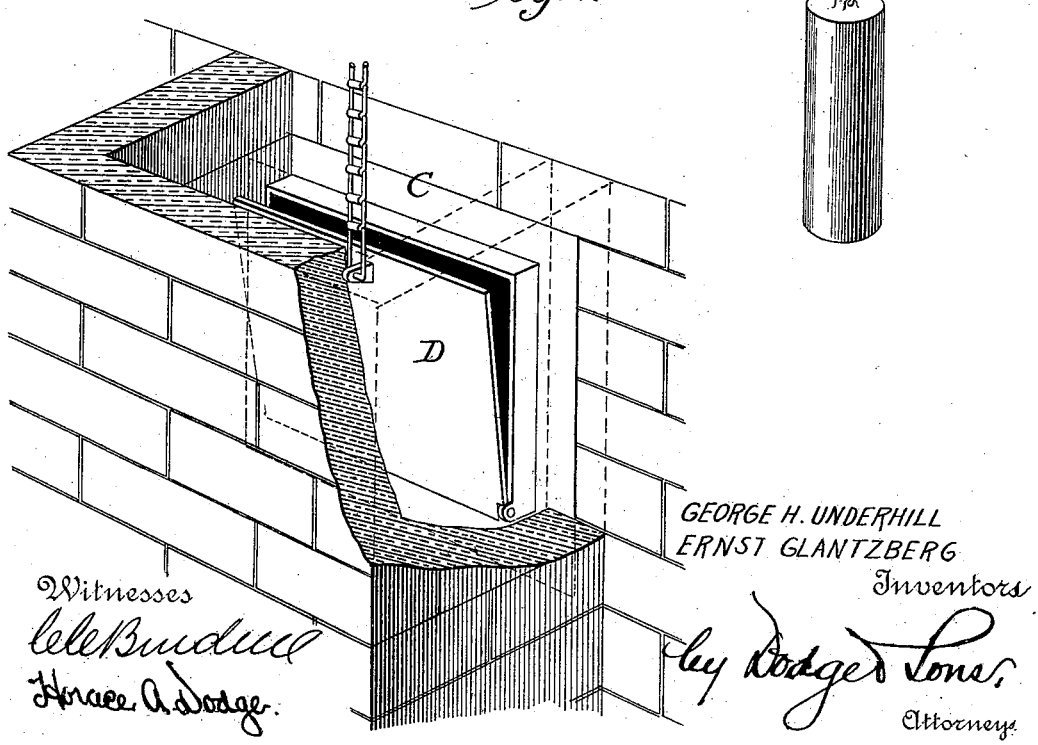

(No Model.) 2 Sheets—Sheet 1.

G. H. UNDERHILL & E. GLANTZBERG.
TEMPERATURE REGULATOR.

No. 544,015. Patented Aug. 6, 1895.

Witnesses

GEORGE H. UNDERHILL
ERNST GLANTZBERG
Inventors

Attorneys (No Model.) 2 Sheets—Sheet 2.
G. H. UNDERHILL & E. GLANTZBERG.
TEMPERATURE REGULATOR.
No. 544,015. Patented Aug. 6, 1895.
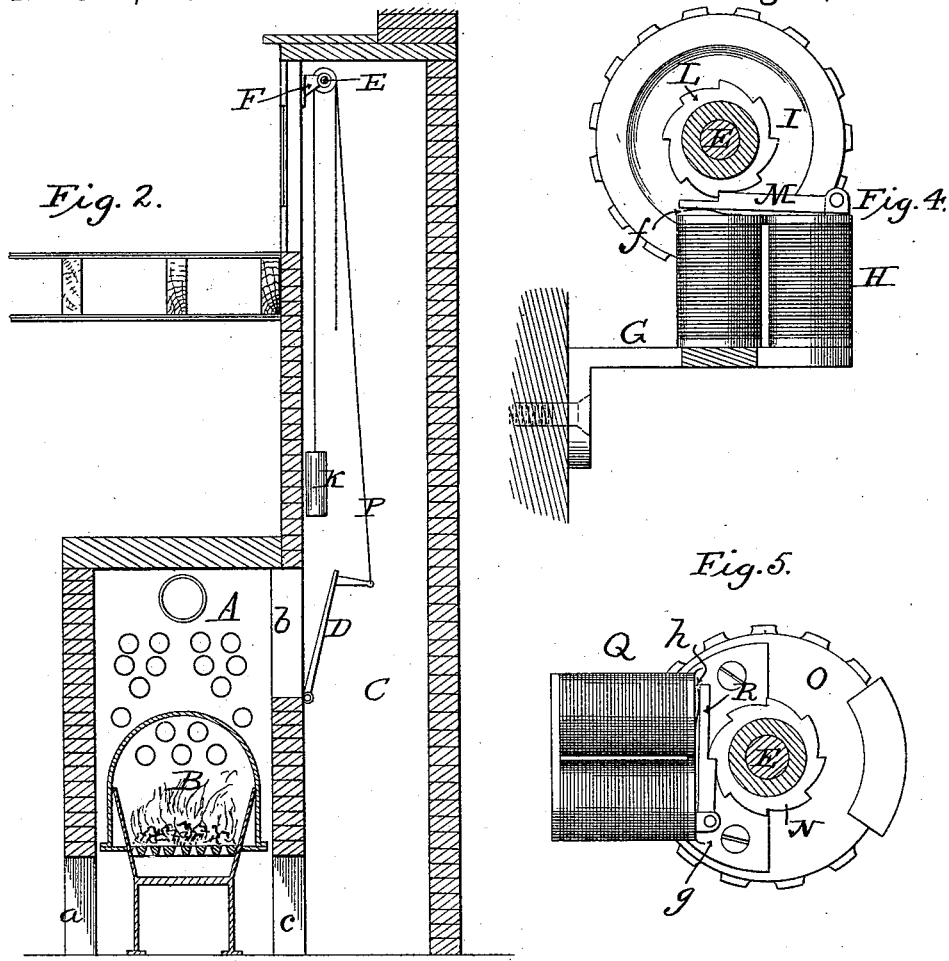
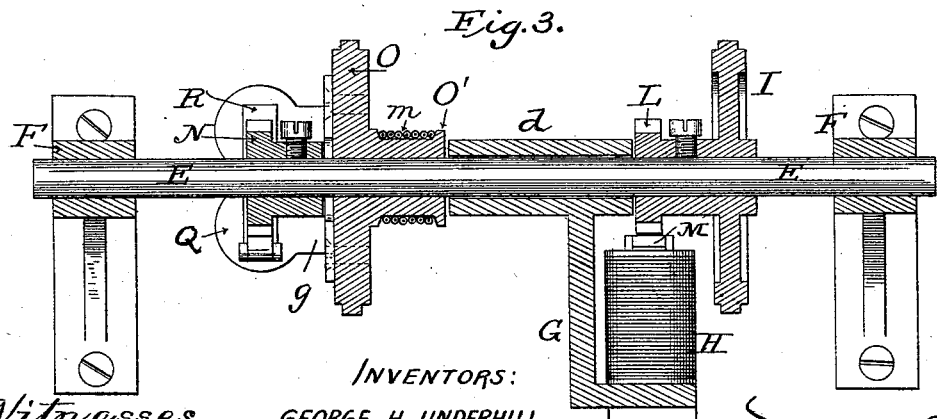
Witnesses.
Inventors:
GEORGE H. UNDERHILL
ERNST GLANTZBERG.
by Dodge & Sons,
Att'ys.

UNITED STATES PATENT OFFICE.

GEORGE H. UNDERHILL AND ERNST GLANTZBERG, OF BOSTON, MASSACHUSETTS; SAID GLANTZBERG ASSIGNOR TO SAID UNDERHILL.

TEMPERATURE-REGULATOR.

SPECIFICATION forming part of Letters Patent No. 544,015, dated August 6, 1895.

Application filed November 17, 1893. Serial No. 491,213. (No model.)

*To all whom it may concern:*

Be it known that we, GEORGE H. UNDERHILL, a citizen of the United States, and ERNST GLANTZBERG, a subject of the King of Sweden and Norway, residing at Boston, in the county of Suffolk and State of Massachusetts, have invented certain new and useful Improvements in Temperature-Regulators, of which the following is a specification.

Our invention relates to temperature-regulators, and consists in various features, details, and combinations hereinafter set forth and claimed.

Under existing plans of temperature regulation a thermostat is usually employed to close an electric circuit whenever the temperature reaches a predetermined point above or below the desired normal degree, such completion of the circuit causing the energization of an electromagnet, by which a detent is withdrawn to release a weight or to start a motor for opening or closing a valve, damper, or other controlling device. Such arrangement involves the movement of the valve or damper from one to the other limit of adjustment—that is to say, it is caused to fully open or to completely close at each completion of the electric circuit and to remain in the adjustment last given until the temperature changes from one to the other limit of the range of the thermostat. This sudden and extreme variation in adjustment of the valve, damper, or other controlling device is highly objectionable, because it involves constant fluctuation in the temperature of the apartment. This difficulty is particularly serious where the valve controls the admission of cold air or of both cold and warm air, which is now a common and approved arrangement, designed to insure the constant introduction of abundant quantities of air, either warm or cold, as may be required.

In cold climates the sudden and complete stoppage of the warm-air supply and full opening of the cold-air inlet causes the temperature of the apartment to drop suddenly from the highest point within the range of the thermostat to the lowest, and as soon as this lowest point is reached a reversal of the valve occurs, causing a full supply of heated air and the rise of temperature to the highest point within the range of the thermostat. Thus the temperature is perpetually changing, and the cold air, often considerably below zero, thoroughly chills the occupants of the apartment before the thermostat responds and causes the cold air to be cut off and the warm air to be admitted.

Our invention is designed to obviate the constant fluctuation in temperature, and to this end it consists in causing the movement of the valve, damper, or other controlling device to take place gradually, or little by little, opening or closing only so much as may be necessary to bring the temperature to the required degree and there leaving it at rest. This result we attain by introducing into the circuit in which the thermostat is included a device which shall normally open said circuit, but which shall at stated intervals momentarily close the circuit at the point where it is located, so that if the thermostat makes contact with either of its stops during such closure the circuit will be completed long enough to momentarily withdraw a detent and permit a weight, motor, or other device to move the valve or damper one short step in the range of its movement. At each closing of the circuit by and at the point where the periodic circuit-closer is located the detent will be withdrawn, provided the thermostat still bears against one of its stops and thereby completes the circuit. Two detents are provided, one in each branch of the thermostat circuit, one to release the opening and the other to release the closing mechanism. Hence the valve, damper, or other controlling device will be gradually opened or gradually closed, as required, until the desired condition is attained.

The accompanying drawings illustrate one of many possible embodiments of our invention.

Figure 1 is a perspective view of the mechanism, showing the periodic circuit-closer and circuits diagrammatically; Fig. 2, a sectional view illustrating the arrangement of the air-flue and the valve controlling admission of warm and of cold air; Figs. 3, 4, and 5, detail views of the valve-actuating mechanism hereinafter described.

Fig. 1 represents the parts separated somewhat more than is necessary in practice to render their action more clear.

As above intimated, the apparatus may be embodied in various forms without departing from the spirit of our invention, and the periodic circuit-closer may be of any usual or common form.

Referring again to the drawings, A indicates a chamber, in which is located a heater B, of suitable description. The chamber B has at one side an inlet $a$ for admission of fresh air, usually from outside the building, and at the opposite side two openings or two series of openings $b$ and $c$, each connecting with a flue C, through which air is carried to the apartment to be warmed.

D indicates a valve, one edge of which is hinged at the lower side of opening $b$, so that the valve may be brought to a vertical position and caused to close opening $b$, thereby cutting off the flow of warm air into and through the flue C; or the valve may be dropped until its free edge rests against the further wall of the flue, thereby opening the warm-air passage $b$ and cutting off the flow of cold air from opening $c$ upward through flue C. This arrangement of valve and passages is set forth in Letters Patent to Isaac D. Smead, dated August 1, 1882, No. 261,879, and is here represented because the present invention is primarily intended to be used in connection therewith, though not at all confined to such use or application.

It will be seen that by adjusting the valve to different angles between its extremes of movement it is practicable to mingle the warm and cold air in any desired proportions in flue C, and hence we prefer to combine the regulating mechanism therewith.

As best shown in Figs. 1 and 3, we provide a shaft E, the ends of which are journaled and capable of rotation in suitable hangers or supports F. The shaft is or may be further sustained by a sleeve $d$, formed upon a bracket G, secured to the wall of flue C or to other firm support, said bracket being primarily intended, however, to support an electromagnet H, Figs. 1, 3, and 4. I, in said figures, indicates a sprocket-wheel, or it may be a pulley, over which passes a chain or flexible band J, carrying at one end a weight K. The wheel I is made fast to shaft E by set-screw, key, or otherwise, as is also a ratchet-wheel L, the two being preferably made integral and secured by a single set-screw, as shown in Figs. 1 and 3. Ratchet-wheel L is located directly in plane with a soft iron keeper or armature M, pivotally supported at one end upon the spool or bobbin of electromagnet H, while its opposite end is normally thrown upward by a light spring $f$, and caused to engage with the teeth of ratchet-wheel L, and thereby to prevent the rotation of shaft E under the influence of weight K.

It will be readily understood that if the magnet H be momentarily energized and again immediately de-energized the armature or detent M will be withdrawn for an instant, permitting the ratchet-wheel L to advance one tooth and then to be relocked.

N indicates a second ratchet-wheel, likewise made fast to the shaft E by set-screw, key, or otherwise, and O is a sprocket-wheel or pulley, over which passes a chain or flexible band P, one end of which is connected with valve D, as shown in Figs. 1 and 2.

The wheel O is loose upon the shaft E, and has formed upon or secured to it a projecting arm $g$, which carries an electromagnet Q with a pivoted armature R, similar to that of electromagnet H, and arranged to engage with the teeth of ratchet-wheel N, except when withdrawn therefrom through energization of the magnet Q.

From what has been said it will be apparent that whenever the ratchet-wheel L is permitted to advance the shaft E and ratchet-wheel N will move through a corresponding number of degrees, and since the detent of electromagnet Q is normally in engagement with said ratchet-wheel the magnet Q, its bracket, and the wheel O will be caused to move with the shaft. In this way the chain or band P will be taken up and the valve D will be correspondingly elevated—that is to say, it will be advanced proportionately to the advance of one tooth of ratchet-wheel L. If this action be repeated a sufficient number of times the valve D may be carried from its lowest to its highest position, but such movement will be gradual and by repeated short steps. It is particularly to be observed, however, that these steps are not necessarily and in all cases repeated, and that instead of always moving the valve from one extreme to the other, the movement may be, and ordinarily will be, only partial.

Assuming now that electromagnet H is de-energized and that electromagnet Q be momentarily energized and again quickly de-energized, the armature or detent R will be attracted by the magnet Q and withdrawn from engagement with ratchet-wheel N for an instant. During this momentary release, the detent or armature R, electromagnet Q, bracket $g$, and wheel O will advance by reason of the weight of valve D drawing down upon chain or band P, but the magnet Q being immediately de energized again its armature R is thrown outward by a light spring $h$ and caused to engage with the next tooth of ratchet-wheel N, thereby limiting the advance of said parts and the descent of valve D.

Each repetition of the action just stated will permit the valve D to lower a short distance proportionate to one tooth of ratchet-wheel N, but this action, like that of raising the valve, will take place only gradually, and to just such varying extent as required, usually less than complete lowering of the valve.

Referring now to Fig. 1, the circuit-controlling devices by which the opening or closing of the valve is determined will be explained.

S indicates a clock mechanism, represented conventionally, and T indicates a circuit-closing disk or wheel having a contact-point $i$, adapted to make momentary contact once in each revolution with a contact-spring $j$ included in the circuit of a battery U or other source of electric energy. There may be more than one contact-point $i$, if preferred, but whatever be the number they will be spaced or arranged with reference to the time required for one rotation of the disk T, so that contact shall be made with spring $j$ at regular intervals. This result may be attained by regulating or adjusting the time mechanism to run fast or slow in any of the usual ways.

V indicates a thermostat, from which a wire or conductor extends to one binding-post of battery U. The movable end or portion of the thermostat (which is here represented as a compound bar fixed at one end) plays between two contact studs or screws $k$ and $l$, the former set at such point that the thermostatic bar V shall make contact with it when the temperature falls to a predetermined minimum—say 68° Fahrenheit. From the contact-point $k$ a wire or conductor $m$ passes to electromagnet Q and thence back to the disk T of the time device S. Hence if the thermostat-bar V is in contact with point $k$ at the moment that the point $i$ makes contact with spring $j$, the electric circuit will be completed from battery U by bar V to conductor $m$ through the coils of electromagnet Q to disk T and through contacts $i$ and $j$ back to battery U. Owing to the brief contact of points $i$ and $j$ the circuit is interrupted almost as soon as it is completed, and hence armature R is attracted and released almost in the same instant. Thus it can clear but one tooth of ratchet-wheel N and can lower valve D only a short distance. Hence the warm-air inlet is but slightly increased and the cold-air inlet is but slightly decreased. The parts remain in this position until the disk T travels far enough to again bring point $i$ into contact with spring $j$, at which time the operation just stated will be repeated, provided the temperature of the apartment still remains at the predetermined low limit, still causing contact of bar V with point K to be maintained. If, on the other hand, the temperature has meanwhile risen sufficiently to cause the bar V to move off contact K, the lowering of the valve will not be repeated. Thus it will be seen that at each contact of the point $i$ with spring $j$ during maintenance of contact of bar V with point $k$ the valve D will be lowered one step, but the lowering will cease the moment contact is destroyed between V and $k$, notwithstanding contact of $i$ and $j$, which recurs at stated periods, ordinarily about every ten minutes.

Assuming next that the temperature rises to a predetermined maximum—say 72° Fahrenheit—the bar V will move to and make contact with contact point or screw $l$. A wire or conductor $n$ passes from contact $l$ to the coils of electromagnet H, and thence to disk T, so that at the moment that point $i$ of said disk makes contact with spring $j$ during maintenance of contact between V and $l$ a circuit will be completed from battery U by bar V, contact $l$, and conductor $n$ to electromagnet H, and thence to disk T and through contacts $i$ $j$ back to battery U. This circuit will be completed only for an instant, being quickly interrupted again by reason of point $i$ passing and breaking contact with spring $j$, as above explained.

During the energization of magnet H, its armature M is withdrawn, permitting weight K to turn shaft E the distance represented by one tooth of ratchet-wheel L, but the magnet being at once de-energized the armature engages the next tooth of the ratchet-wheel and limits the rotation of the shaft and the consequent elevation of the valve D. Should the temperature continue at the predetermined maximum until the point $i$ is again brought into contact with spring $j$, the action just recited will be repeated, but if the previous slight change of adjustment shall have caused the temperature to fall below the predetermined maximum the bar V will have withdrawn from the point $l$ and hence the battery-circuit will not be completed, even though point $i$ makes contact with spring $j$.

The manner of conveying the current to electromagnet Q is of no particular importance, and may be by means of any common and convenient form of commutator. We have, however, shown the incoming and returning branches of wire $m$ as insulated and wound upon a spool O', formed with or secured to wheel O. The wheel O and spool O' in in practice make only a few revolutions at most, and the length of conductor wound on and off the spool compensates for this movement and avoids injury of the conductor.

In practice it is customary to provide for variation of temperature between about 67° or 68° and 72° or 73° Fahrenheit as minimum and maximum, but this of course is wholly optional. It will be found convenient also to have contact made by the periodic circuit-closer at intervals of about ten minutes, though the length of these intervals may be made greater or less as deemed expedient.

The important features of the invention are the gradual adjustment of the valve and the limitation of its movement to accord with the requirements of the case, as contradistinguished from arbitrary and unvarying movement from a full open to a full closed position, or vice versa.

It is of course apparent that instead of weight K, any other convenient motor or source of power may be availed of to rotate shaft E, though the weight answers well. It however requires to be raised from time to time, which may be conveniently done by merely drawing down upon the other end of chain or band J, the armature M acting in the same manner as the click or pawl of a clock or watch.

The weight or motor requires to be wound only at considerable intervals, which should be not less than twenty-four hours and may be much longer. As the shaft E turns backward during the winding operation and carries with it the ratchet-wheel R, it is apparent that the valve will be free to fall, close the cold-air inlet and open the warm-air inlet, unless the wheel O be held at rest during the winding operation. This may readily be done with one hand, while the weight is raised with the other; but as the winding is only performed at long intervals and as the apparatus automatically restores the valve to proper position in a short time it is unimportant that the wheel O be held.

The mechanism herein set forth is merely illustrative of one embodiment of the invention, it being obvious that a brake or clutch of any form capable of promptly locking and releasing the parts may be substituted for the ratchet-wheels and pawls or detents shown.

Any form or system of heating apparatus may be used, and the regulation may be effected through a steam-valve, damper, or register, or otherwise, according to the system employed.

It is obvious, also, that instead of a single valve to control both the warm and cold air supply, or to regulate the supply of steam or heat, separate valves or dampers may be used.

Having thus described our invention, what we claim is—

1. In an apparatus for regulating temperature, the combination of a valve, damper, or other controlling device, means for imparting motion thereto, magnetically-controlled detents for normally holding the actuating means out of action; a generator or source of electric energy, a periodic circuit closer included in the battery circuit, and a thermostat in circuit with the battery and adapted, jointly with the periodic circuit closer, to close the circuit through the electro-magnet of one or the other of the detents whenever the temperature rises or falls to a predetermined limit.

2. The herein-described temperature regulating apparatus, consisting of a valve, damper or equivalent heat-controlling device, a shaft, means for rotating said shaft, a wheel made fast upon said shaft, a stop adapted to engage said wheel, an electro-magnet for withdrawing said stop, a second wheel made fast upon the shaft, a stop adapted to engage said second wheel, an electro-magnet for withdrawing said stop, a third wheel loosely mounted upon the shaft, carrying the second electro-magnet and stop, and normally held at rest thereby, a connection between said third wheel and the valve, damper or heat-controlling device, a source of electric energy, a thermostat, independent circuits connecting the two electro-magnets with the source of energy, and a periodic circuit closer in circuit with the battery and with both the electro-magnets.

3. In a temperature regulator, the combination of a shaft, means for rotating said shaft, a ratchet wheel carried by said shaft, a detent for engaging said ratchet wheel, an electro-magnet for withdrawing said detent, a second ratchet wheel also carried by said shaft, a loose wheel mounted upon said shaft and provided with a locking device to engage the second ratchet wheel, an electro-magnet for withdrawing said locking device, a damper, valve, or heat-controlling device, a connection between the loose wheel and said heat-controlling device, a periodic circuit closer and a thermostatic circuit closer, both included in circuit with a source of electric energy and with the said electro-magnets, all substantially as set forth.

4. The combination in a heat-regulating apparatus, of a shaft, means for rotating said shaft in one direction, a detent to hold said shaft against rotation, means for withdrawing said detent, a wheel loose upon said shaft, a locking device for locking said wheel to the shaft, a valve, damper or heat-controlling device, a connection between the heat controlling device and the loose wheel, and means for withdrawing the wheel-locking device and permitting said wheel to turn independently of the shaft.

5. The combination in a heat-regulating apparatus, of a shaft, means for rotating said shaft in one direction, a detent to hold said shaft against rotation, a wheel loose upon said shaft, a locking device for locking said wheel to the shaft, a valve, damper or heat-controlling device, a connection between the heat-controlling device and the loose wheel, and electro-magnets for withdrawing the detent or the locking device as required, and thereby permitting the shaft to turn and carry the loose wheel with it, or the loose wheel to turn independently of the shaft.

In witness whereof we hereunto set our hands in the presence of two witnesses.

GEO. H. UNDERHILL.
ERNST GLANTZBERG.

Witnesses:
B. F. HURD,
L. E. JORDAN.